(12) United States Patent
Yucelen et al.

(10) Patent No.: US 8,996,195 B2
(45) Date of Patent: Mar. 31, 2015

(54) SYSTEMS AND METHODS FOR DERIVATIVE-FREE ADAPTIVE CONTROL

(75) Inventors: Tansel Yucelen, Atlanta, GA (US); Kilsoo Kim, Atlanta, GA (US); Anthony J. Calise, Collegeville, PA (US)

(73) Assignee: Georgia Tech Research Corporation, Atlanta, GA (US)

( * ) Notice: Subject to any disclaimer, the term of this patent is extended or adjusted under 35 U.S.C. 154(b) by 10 days.

(21) Appl. No.: 13/445,610

(22) Filed: Apr. 12, 2012

(65) Prior Publication Data

US 2012/0265367 A1 Oct. 18, 2012

Related U.S. Application Data

(60) Provisional application No. 61/474,529, filed on Apr. 12, 2011.

(51) Int. Cl.
*G05B 13/00* (2006.01)
*G06F 7/00* (2006.01)
*G05B 13/02* (2006.01)
*G05B 13/04* (2006.01)

(52) U.S. Cl.
CPC ................................. *G05B 13/042* (2013.01)
USPC ................................................ 701/1; 700/32

(58) Field of Classification Search
CPC .. G05B 13/042; G05B 13/021; G05B 13/027; G05D 1/0246; G05D 1/0623; G06L 9/4609; B60K 31/0008; G08G 1/202; B64C 13/16; B62D 5/003; G01C 21/165; G01C 25/005; G01S 7/003; G06Q 40/02; G06Q 40/06; G21D 3/00

USPC ............ 701/1, 3, 10, 43, 500, 511; 705/36 R; 700/28, 32, 37; 376/216; 706/23
See application file for complete search history.

(56) References Cited

U.S. PATENT DOCUMENTS

| 4,770,841 | A | * | 9/1988 | Haley et al. ................... 376/216 |
| 5,640,323 | A | * | 6/1997 | Kleimenhagen et al. ......... 701/1 |
| 6,208,914 | B1 | * | 3/2001 | Ward et al. ........................ 701/3 |
| 8,024,119 | B2 | * | 9/2011 | Zeng et al. .................... 701/511 |
| 2002/0042668 | A1 | * | 4/2002 | Shirato et al. ..................... 701/1 |
| 2002/0099677 | A1 | * | 7/2002 | Calise et al. .................... 706/23 |
| 2004/0267424 | A1 | * | 12/2004 | Yao et al. ........................ 701/43 |
| 2005/0182499 | A1 | * | 8/2005 | Calise et al. .................... 700/28 |
| 2008/0046137 | A1 | * | 2/2008 | Shue .............................. 701/10 |
| 2008/0120031 | A1 | * | 5/2008 | Rosenfeld et al. ............ 701/220 |

(Continued)

*Primary Examiner* — Tuan C. To
*Assistant Examiner* — Yuri Kan
(74) *Attorney, Agent, or Firm* — Troutman Sanders LLP; Ryan A. Schneider; Benjamin C. Wiles

(57) ABSTRACT

An adaptive control system is disclosed. The control system can control uncertain dynamic systems. The control system can employ one or more derivative-free adaptive control architectures. The control system can further employ one or more derivative-free weight update laws. The derivative-free weight update laws can comprise a time-varying estimate of an ideal vector of weights. The control system of the present invention can therefore quickly stabilize systems that undergo sudden changes in dynamics, caused by, for example, sudden changes in weight. Embodiments of the present invention can also provide a less complex control system than existing adaptive control systems. The control system can control aircraft and other dynamic systems, such as, for example, those with non-minimum phase dynamics.

20 Claims, 3 Drawing Sheets

(56) References Cited

U.S. PATENT DOCUMENTS

| | | | |
|---|---|---|---|
| 2008/0294568 A1* | 11/2008 | Plagge | 705/36 R |
| 2009/0143925 A1* | 6/2009 | Lavretsky et al. | 701/3 |
| 2011/0282523 A1* | 11/2011 | Shue | 701/10 |
| 2012/0265367 A1* | 10/2012 | Yucelen et al. | 701/1 |

* cited by examiner

SYSTEMS AND METHODS FOR DERIVATIVE-FREE ADAPTIVE CONTROL

CROSS-REFERENCE TO RELATED APPLICATIONS AND PRIORITY CLAIM

This application claims priority under 35 U.S.C. §119(e) to, and the benefit of, U.S. Provisional Patent Application No. 61/474,529, entitled "Derivative-Free Output Feedback Adaptive Control," filed 12 Apr. 2011. The entirety of the above-mentioned Application is hereby incorporate by reference as if set forth in its entirety below.

STATEMENT REGARDING FEDERALLY SPONSORED RESEARCH

The present invention was made with United States Government support under contract number NNX08AC61A awarded by NASA. The United States Government has certain rights in the present invention.

BACKGROUND OF THE INVENTION

1. Field of the Invention

Embodiments of the present invention relate to control systems, and particularly, to adaptive control architectures for uncertain dynamic systems.

2. Background of Related Art

An adaptive controller is a controller that makes adjustments, i.e., adaptations, to control an uncertain system. Uncertain systems are systems that can have fixed or time varying parameters with values that are only approximately known. Examples of these parameters include, but are not limited to, aerodynamic coefficients of aircraft, mode shapes of vibrating structures, and parameters associated with dynamics of turbine engines, combustion processes, and chemical reactions. The variations in the parameters may be due to changes in the operation of a system or process, or may be due to other factors, such as, for example, releasing a payload, docking in space, or unknown failures in subsystem components.

Existing adaptive controllers are used to control several types of systems, or "plants," as they are known in the art. They are frequently used, for example and not limitation, to control automobile and aircraft engines and in aircraft flight controls.

Many types of adaptive controllers are known. Some adaptive controllers, for example, attempt to control uncertain systems by employing a state observer. The state observer provides an estimate of the system's internal state using measurements, or sensed quantities, of the uncertain system. The adaptive controller can then adapt to these sensed quantities and provide an output that stabilizes the uncertain system.

Generally, research in adaptive control is motivated by the desire to maintain a specified level of performance in the presence of modeling errors. Performance is usually measured by the reaction speed of a response to an externally generated command, and the ability of the response to accurately track the externally generated command as measured by the difference between the response and the corresponding commanded value. Modeling errors are usually caused by uncertainties associated with dynamic responses of the systems being controlled.

Adaptive controllers can be classified as either state feedback or output feedback. State feedback controllers, for example, can have computationally simpler adaptive control algorithms compared to output feedback algorithms. This can be because, for example, state feedback controllers do not require the use of a state observer. Output feedback adaptive controllers, however, are required for applications in which it is impractical or impossible to sense the entire state of the process or system under control. Examples of such processes or systems include, but are not limited to, active noise suppression, active control of flexible space structures, fluid flow control systems, combustion control processes, control of chemical processes, automotive control systems, flight control of large flexible aircraft and launch vehicles, and low cost or expendable unmanned aerial vehicles. Models for these applications vary from reasonably accurate low frequency models, e.g., in the case of structural control problems, to less accurate low order models, e.g., in the case of active control of noise, vibrations, flows, and combustion processes.

There have been a number of proposed approaches for the design of output feedback adaptive controllers. All of these approaches contain inherent limitations. Some approaches rely on high gain observers, for example, to reconstruct the states of the controlled process that are not available for feedback. High gain approaches, however, are often impractical due to, for example, the amplification of sensor noise and the potential for unstable responses due to unmodeled high frequency dynamics. Other approaches use an output feedback adaptive controller with an error observer instead of a state observer. These approaches are undesirable, however, because they require unnecessarily complex designs and rely on high gains, which can lead to unstable responses.

Incorporating an adaptive controller for uncertain dynamic systems can mean the replacement of an existing control system. It is highly desirable, however, for an adaptive approach to simply augment an existing controller. Recently, one approach has introduced an adaptive output feedback design that relies on the properties of so-called LQG/LTR controllers that asymptotically satisfy a strictly positive real condition. See E. Lavretsky, "Adaptive Output Feedback Design Using Asymptotic Properties of LQG/LTR controllers," *AIAA Guidance, Navigation, and Control Conference*, Toronto, Canada (2010).

This approach minimizes the complexity of the control architecture, but cannot be used to augment an existing controller design and cannot be applied to systems containing non-minimum phase dynamics. This is because, for example, the stability analysis associated with this approach relies on the fact that the designer can set gains at arbitrary high values. Moreover, like other approaches to output feedback adaptive control, it assumes constant unknown ideal weights. This assumption can cause a less-accurate response when uncertain parameters undergo rapid time variations, during sudden changes in system dynamics, and/or when the system is subjected to a time varying external disturbance. It is therefore undesirable in many scenarios.

Another deficiency of existing approaches to adaptive control is that their weight adaptation laws often employ numerical integration. While the integration can reduce steady state tracking errors, it can also cause a conflict that itself leads to a slowly varying tracking error. The slowly varying tracking error can arise when adaptive controllers that employ integration are used to augment a non-adaptive controller that also employs integration. Thus, to avoid this behavior, it is desirable to use an adaptive controller with a weight update law that does not employ numerical integration.

It would therefore be desirable to have an adaptive controller that does not assume constant unknown ideal weights and instead considers varying ideal weights. Such a controller would be desirable, for example and not limitation, in situations where uncertainties and disturbances undergo variations on the same time scale as that of the system being controlled. The controller should be able to augment an existing non-adaptive control design without modifying the gains of that design, and should be less complex than existing adaptive controllers. The controller should additionally be able to control both minimum phase and non-minimum phase systems and should not require the use of high gains. The controller should also afford freedom in the selection of basis functions used to parameterize the uncertainty within the plant dynamics. The controller should also avoid weight update laws that require numerical integration. It is to such a controller that embodiments of the present invention are primarily directed.

SUMMARY OF THE INVENTION

Embodiments of the present invention relate to control systems, and particularly, to adaptive control architectures for uncertain dynamic systems. In some embodiments, a controller can employ derivative-free output feedback adaptive control architectures. In other embodiments, the controller can employ derivative-free state feedback adaptive control architectures. The controller can further employ one or more time-varying weight update laws. The assumption of constant unknown ideal weights commonly used in the design of adaptive controllers, however, can be avoided to provide a more accurate response during sudden changes in system dynamics. Accordingly, while many types of systems can be controlled, embodiments of the present invention are advantageous for systems that can undergo sudden changes in dynamics, such as those caused by, for example and not limitation, reconfiguration, deployment of a payload, docking, and structural damage.

Embodiments of the present invention offer several advantages not provided by existing systems. In some embodiments, for example, the present invention can minimize the complexity of an adaptive control system compared to many existing adaptive control systems. Complexity can be minimized, for example and not limitation, by employing the state observer of an existing, non-adaptive control design without any modification to its gains. Moreover, in some embodiments, the only dynamic element added to the existing design is the weight update law, which further minimizes complexity. Embodiments of the present invention can also control both minimum phase and non-minimum phase systems. This is advantageous because, for example, non-minimum phase systems commonly arise when dealing with aircraft longitudinal dynamics, which can be difficult to control. In some embodiments, the present invention can be used to augment an existing non-adaptive control design without modification of the gains employed in that design.

Embodiments of the present invention can employ a derivative-free weight update law that is particularly well-suited for adaptation to time-varying systems. The derivative-free weight update law can also be suited for adaptation to discontinuous changes in uncertain system dynamics.

Embodiments of the present invention can also employ a derivative-free adaptive control law. The adaptive control law can differ from the laws conventionally employed in adaptive control in that it does not make use of integration to generate the weight update law. This is advantageous in avoiding conflicts, such as tracking errors, that may arise when the adaptive control law is used to augment a non-adaptive controller which itself has integral action.

In some embodiments, controllers of the present invention can avoid the use of high gains in both the observer design and the derivative-free weight update law. This is desirable because high gains can, for example, amplify sensor noise and increase the potential for unstable responses due to unmodeled high frequency dynamics. In some embodiments, controllers of the present invention also afford significant freedom in the selection of basis functions used to parameterize the uncertainty within the plant dynamics. Additionally, embodiments of the present invention avoid integration of an error signal in the implementation of the adaptive control law. This can help avoid, for example, slowly varying tracking errors.

Embodiments of the present invention can comprise an adaptive control system for controlling a vehicle. In some embodiments, the adaptive control system can comprise a state observer that can be configured to receive a sensed quantity from the vehicle. The state observer can be further configured to output a state estimate based at least in part on the sensed quantity.

In some embodiments, the adaptive control system can also comprise a controller configured to receive the state estimate and employ the state estimate in a derivative-free adaptive control law to calculate an adaptive control. The derivative-free adaptive control law can be based at least in part on a derivative-free weight update law. The derivative-free weight update law can comprises a time-varying estimate of an ideal vector of weights. In some embodiments, the controller can further be configured to produce a control command that can be an input to a control system of the vehicle. A component of the control command can be the adaptive control.

In some embodiments, the derivative-free weight update law can comprise a first gain, and the first gain can provide a parameter dependent Riccati equation with a positive definite solution. In some embodiments, a parameter other than the first gain of the parameter dependent Riccati equation can restrict the values of the first gain for which the parameter dependent Riccati equation can have a position definite solution.

In some embodiments, the control command can further comprise a nominal control from the existing control system of the vehicle. The nominal control can comprise a first gain. The adaptive control can be added to the nominal control, and, in some embodiments, the first gain of the nominal control is not modified by the adaptive control. In some embodiments, the nominal control can comprise a first gain and a second gain, and either the first gain, the second gain, or both can be employed by the state observer. In some embodiments, the adaptive control can comprise a weight estimate and a basis function. The weight estimate can be obtained from the derivative-free weight update law.

Embodiments of the present invention can comprise a method for adaptive control of an uncertain system. The method can comprise providing a first control command as an input to the uncertain system, and the first control command can comprise a first adaptive control. The method can further comprise receiving at least one sensed quantity from the uncertain system by a state observer, and outputting a state estimate from the state observer. The method can further comprise employing the state estimate in a derivative-free adaptive control law to calculate a second adaptive control. The derivative-free adaptive control law can comprise a derivative-free weight update law. The derivative-free weight update law can comprises a time-varying estimate of an ideal vector of weights. In some embodiments, the method can further comprise providing a second control command as an input to the uncertain system. The second control command can comprise the second adaptive control.

In some embodiments, the derivative-free weight update law can comprise a first gain, and the first gain can provide a parameter dependent Riccati equation with a positive definite solution. In some embodiments, a parameter other than the first gain of the parameter dependent Riccati equation can restrict the values of the first gain for which the parameter dependent Riccati equation can have a position definite solution. In some embodiments, a weight estimate and a basis function can be multiplied together to yield the second adaptive control. The weight estimate can be obtained from the derivative-free weight update law. In some embodiments, the weight estimate can be a function of continuous time. In other embodiments, the weight estimate can be a function of discrete time.

In some embodiments, the second control command can comprise the second adaptive control added to a nominal control. The nominal control can comprise a gain, and, in some embodiments, the gain is not modified by the adaptive control. In some embodiments, the uncertain system can be a non-minimum phase system.

Embodiments of the present invention can further comprise a state control system for controlling a vehicle. The state control system can comprise a reference model configured to output a state estimate. The state control system can further comprise a controller configured to receive the state estimate and employ the state estimate in a derivative-free adaptive control law to calculate an adaptive control. The derivative-free adaptive control law can be based at least in part on a derivative-free weight update law. The derivative-free weight update law can comprises a time-varying estimate of an ideal vector of weights. In some embodiments, the controller can further be configured to produce a control command that can be an input to a control system of the vehicle. A component of the control command can be the adaptive control.

In some embodiments, the derivative-free weight update law further comprises a first gain, and the first gain can provide a parameter dependent Riccati equation with a positive definite solution. In some embodiments, a parameter other than the first gain of the parameter dependent Riccati equation can restrict the values of the first gain for which the parameter dependent Riccati equation has a position definite solution.

In some embodiments, the control command can further comprise a nominal control from the control system of the vehicle. The nominal control can comprise a first gain. The adaptive control can be added to the nominal control, and, in some embodiments, the first gain of the nominal control is not modified by the adaptive control. In some embodiments, the adaptive control comprises a weight estimate and a basis function. The weight estimate can be obtained from the derivative-free weight update law.

These and other objects, features and advantages of the present invention will become more apparent upon reading the following specification in conjunction with the accompanying drawing figures.

DETAILED DESCRIPTION

Figure 1:
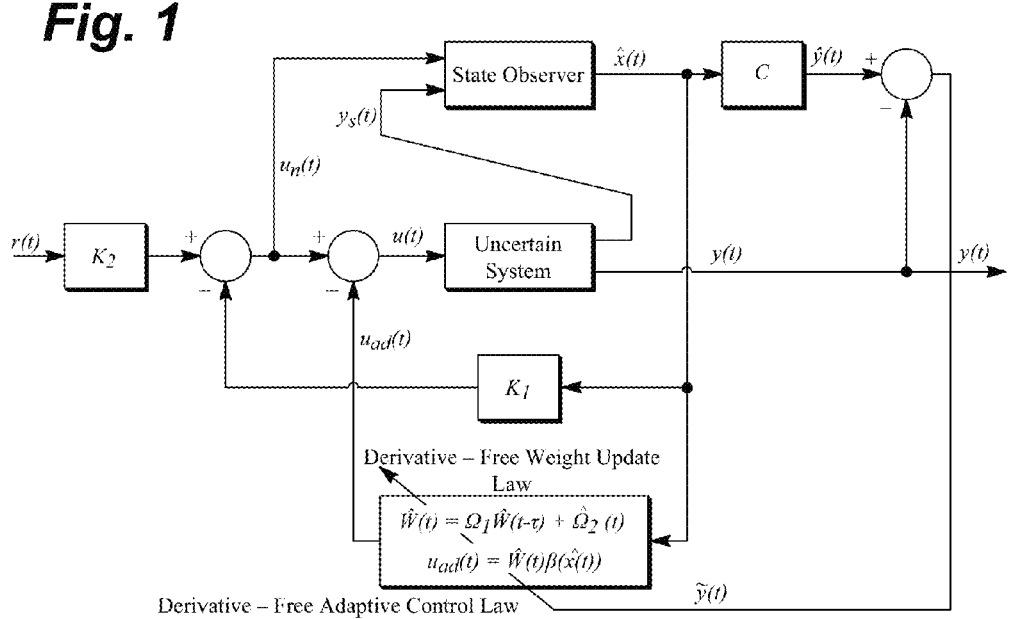
FIG. 1 is a schematic of an adaptive control system, in accordance with some embodiments of the present invention.

Embodiments of the present invention can comprise an adaptive control system for controlling an uncertain system. More specifically, embodiments of the present invention can comprise an output feedback or state feedback adaptive control architecture for continuous time and uncertain dynamic systems. In some embodiments, the controller can employ derivative-free adaptive control architectures, such as, for example, derivative-free weight update laws. The controller can further employ one or more time-varying weight update laws. The time-varying weight update laws can be a function of a weight estimate which, in turn, can be a function of continuous time or discrete time.

Embodiments of the present invention can control both minimum phase and non-minimum phase systems. In some embodiments, the present invention can augment an existing, non-adaptive control design without modifying the gains employed in that design. Embodiments of the present invention can employ a derivative-free weight update law that is well-suited, for example, for adaptation to time-varying systems. The derivative-free weight update law is also well-suited for adaptation to discontinuous changes in uncertain system dynamics. In some embodiments, controllers of the present invention can avoid the use of high gains in both the observer design and the derivative-free weight update law. In some embodiments, controllers of the present invention can also afford significant freedom in the selection of basis functions used to parameterize the uncertainty within the plant dynamics. Embodiments of the present invention can also avoid integration of an error signal in the implementation of the adaptive control law.

To simplify and clarify explanation, the system is sometimes described below as an adaptive control system and/or method for controlling an aircraft. One skilled in the art will recognize, however, that the invention is not so limited. The system can also be deployed for other control-related applications, such as, for example and not limitation, controlling an automobile engine or combustion process.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

As mentioned above, a problem with existing adaptive controllers is that they assume constant ideal weights. Embodiments of the present invention, however, can avoid reliance on this assumption. Instead, embodiments of the present invention can employ a derivative-free weight update law with a time-varying ideal vector of weights.

Embodiments of the present invention can also employ a parameter dependent Riccati equation in the stability analysis to avoid high gain approaches. Aspects of this analysis are detailed in T. Yucelen, K. Kim, & A. J. Calise, "Derivative-Free Output Feedback Adaptive Control," *AIAA Guidance, Navigation, and Control Conference*, Portland, Oreg. (2011), which is hereby incorporated by reference in its entirety as if fully set forth herein. Employing a parameter dependent Riccati equation in this manner renders embodiments of the present invention able to adaptively control minimum phase and non-minimum phase systems. This is due, at least in part, to the system's ability to avoid high gains. Moreover, embodiments of the present invention represent an extension of the state feedback derivative-free adaptive control law developed in T. Yucelen & A. J. Calise, "Derivative-Free Model Reference Adaptive Control," *AIAA Journal of Guidance, Control, and Dynamics*, vol. 34, No. 4, pp 933-950 (2011), which is also hereby incorporated by reference in its entirety as if fully set forth herein.

FIG. 1 illustrates a preferred embodiment of an adaptive control system of the present invention. As shown in FIG. 1, an input to the uncertain system can be a vector control command, u(t). In an aircraft, components of u(t) can represent the control surface deflections, e.g., elevator, aileron, and rudder deflections. In some embodiments, u(t) can represent the signals sent to the electrical or hydraulic actuators that move the control surfaces. As shown in Equation 1 below, u(t) can be the sum of two vector components:

$$u(t) = u_n(t) + u_{ad}(t)$$ Equation 1:

The first vector component of Equation 1, $u_n(t)$, can be the "nominal control." The nominal control can be a portion of an input produced by an existing, non-adaptive control law. In some embodiments, the existing, non-adaptive control law can be produced by an existing on-board control system. This control law can be made up of a feedback gain $K_1$, a feedforward gain $K_2$, and a state observer output. The methods used for designing the feedback and feedforward gains, as well as the state observer output, are well known in the art to engineers and designers who practice in the areas of non-adaptive feedback control systems and feedback form for multiple-input, multiple-output systems. These methods apply equally well to minimum phase and non-minimum phase systems, but are dependent on the model employed to represent the dynamics of the system being controlled. Their performance can therefore degrade if modeling uncertainty is present.

The second vector component of Equation 1, $u_{ad}(t)$, can be the "adaptive control." In some embodiments, as shown in Equation 1, the adaptive control can be added to the nominal control. The adaptive control can therefore augment the nominal control. The adaptive control can be produced by a derivative-free adaptive control law and a derivative-free weight update law. As discussed below and shown in FIG. 1, the form of the derivative-free adaptive control law and the methods employed to select the gains, $\Omega_1$ and $\kappa_2$ (in the equation for $\hat{\Omega}_2(t)$), and the time delay parameter, $\tau$, are objects of the present invention.

In FIG. 1, y(t) can represent the regulated output, and $\hat{y}(t)$ can represent its estimate. The difference between y(t) and $\hat{y}(t)$ can be the error signal, $\tilde{y}(t)$, which can be employed in the laws described below. If the uncertainty in the system is small, $\tilde{y}(t)$ can be small, and the adaptive control can remain close the zero.

In some embodiments, equations that describe an uncertain system, as shown in FIG. 1, are assumed to have the form of Equations 2a-2c:

$$\dot{x}(t) = Ax(t) + B[u(t) + \Delta(t,x(t))]$$ Equation 2a:

$$y_s(t) = C_s x(t)$$ Equation 2b:

$$y(t) = Cx(t)$$ Equation 2c:

In some embodiments, $\Delta(t,x(t))$ can represent the uncertainty contained in the system dynamics. This uncertainty can be matched to the control, u(t), so that both the control and the uncertainty can enter the plant dynamics in the same manner, i.e., through input matrix B. It can also be assumed that the other plant parameter matrices, such as, for example and not limitation, A, $C_s$, and C, are known and can be used in the design of the nominal control.

In some embodiments, the signal $y_s(t)$ can represent the vector of sensed quantities from the uncertain system that are available for feedback. In some embodiments, the signal y(t) can be a subset of the elements in $y_s(t)$ that can be regulated in such a manner that y(t) closely follows a command vector, r(t). FIG. 1 shows the manner in which the command vector can enter the control system.

In some embodiments, the state observer can be implemented based on the differential equation labeled Equation 3 below. In Equation 3, the particular design of the observer can be defined by the observer gain matrix, L.

$$\dot{\hat{x}}(t) = A\hat{x}(t) + Bu_n(t) + L[y_s(t) - C_s\hat{x}(t)]$$ Equation 3:

In some embodiments, it can be assumed that the uncertainty in Equations 2a-2c can be linearly parameterized in the sense that the uncertainty can be represented by Equation 4:

$$\Delta(t,x) = W^T(t)\beta(x), |\beta(x)| \leq \bar{\beta}$$ Equation 4:

Equation 4 can be assumed to hold for all values of the state vector, x, within a sufficiently large, but bounded domain of the state space in which the state, x(t), of the system evolves. In some embodiments, W(t) can represent an ideal but unknown vector of weights that can be bounded functions of time. Moreover, $\beta(x)$ can be a known and bounded vector of one or more basis functions to be selected by a designer. Since $\beta(x)$ can be chosen by a designer, $\beta(x)$ can have a computable Euclidian vector norm bound, $\bar{\beta}$.

Commonly, in adaptive control, it is necessary to assume that the ideal vector of weights is constant. In embodiments of the present invention, however, the ideal vector of weights in Equation 4, W(t), can be time-varying, and therefore does not need to be constant. The time-varying vector provides more freedom in the selection of basis functions than a constant vector. In addition, for a given set of basis functions, a time-varying vector provides additional types of uncertainties that can be accurately represented, including uncertainties that are time-varying and/or discontinuous with time. A time-varying vector of weights can also react to sudden changes in system dynamics, such as, for example and not limitation, those caused by deployment of a payload, structural damage, and reconfiguration such as variable wing sweep of an aircraft.

In some embodiments, the purpose of the adaptive control, $u_{ad}(t)$, can be to cancel any uncertainty in the system. Since both W(t) and x(t) can be unknown, however, it can be necessary to employ an estimate for these quantities. Equation 5 represents a derivative-free adaptive control law that can estimate W(t) and x(t):

$$u_{ad}(t) = \hat{W}(t)\beta(\hat{x}(t))$$ Equation 5:

In some embodiments, as shown in FIG. 1, the state estimate, $\hat{x}(t)$, can be obtained from Equation 3, i.e., as an output of the state observer. The weight estimate, $\hat{W}(t)$, can be obtained from a derivative-free weight update law as shown in Equations 6a-6b:

$$\hat{\Omega}_2(t) = \kappa_2 \beta(\hat{x}(t) \tilde{y}^T(t)) \quad \text{Equation 6a:}$$

$$\hat{W}(t) = \Omega_1 \hat{W}(t-\tau) + \hat{\Omega}_2(t) \quad \text{Equation 6b:}$$

In Equation 6b, $\hat{W}(t-\tau)$ can be a time-varying estimate of the ideal vector of weights. Moreover, $\tau$ can be a scalar, positive value that the designer can choose.

In some embodiments, Equations 6a-6b can define the manner in which $\hat{W}(t)$ is propagated in continuous time. Many controllers, however, are implemented in discrete time, denoted by $t_i$. In some embodiments, the time delay parameter for a discrete time system can be an integer multiple, n, of the time interval $dt = t_i - t_{i-1}$. Propagating $\hat{W}(t_i)$ in discrete time can therefore be achieved by a derivative-free weight update law as shown in Equations 7a-7b:

$$\hat{\Omega}_2(t_i) = \kappa_2 \beta(\hat{x}(t_i) \tilde{y}^T(t_i)) \quad \text{Equation 7a:}$$

$$\hat{W}(t_i) = \Omega_1 + \hat{\Omega}_2(t_i) \hat{W}(t_i - n^*dt) \quad \text{Equation 7b:}$$

In Equation 7b, $\hat{W}(t_i - n^*dt)$ can be a time-varying estimate of the ideal vector of weights. Thus, Equations 6b and 7b do not assume constant ideal weights.

In some embodiments, a derivative-free adaptive control law, such as Equation 5, for example, and a derivative-free weight update law, such as Equations 6a-6b or 7a-7b, for example, can be referred to together as a derivative-free adaption law. FIG. 1 depicts a derivative-free adaption law.

In some embodiments, it can be desirable to ensure that the adaptive law of Equations 6a-6b produces a response in which the state of the system remains bounded. It can also be desirable to ensure that the tracking error, $\tilde{y}(t)$, is uniformly ultimately bounded to a sufficiently small error norm. With respect to Equations 7a-7b, it can also be desirable to ensure that the tracking error, $\tilde{y}(t)$, is uniformly ultimately bounded to a sufficiently small error norm for sufficiently small sample time intervals, dt. These goals can be accomplished in embodiments where the design parameters in Equations 6a-6b and/or Equations 7a-7b satisfy Equations 8a-8b:

$$\Omega_1^T \Omega_1 < \kappa_1 I, \kappa_1 < 1/(1+\mu), \mu > 0 \quad \text{Equation 7b:}$$

$$\kappa_2 > 0 \quad \text{Equation 8b:}$$

Values for $\Omega_1$ and $\kappa_2$ can be obtained by the parameter dependent Riccati equation labeled Equation 9:

$$0 = A_e^T P + P A_e + Q_o + (\kappa_2 + 1/\mu) N N^T \quad \text{Equation 9:}$$

where:

$$N = C^T - PB$$

Equation 9 can have a positive definite solution for P. In some embodiments, in Equation 9, the matrix $Q_o > 0$ can be freely chosen so long as it is positive definite. In some embodiments, $A_e = A - LC_s$, where L is the state observer gain matrix from Equation 3 and can be known from the existing controller design. In addition, $\kappa_2$ can be the gain from Equation 8b, which can be determined as a part of the design process. $\kappa_2$ can have an upper limit determined by the condition that the solution for P in Equation 9 must remain positive definite. $\mu$ can be a positive value as described in Equation 8a, and, in some embodiments, can have an upper bound. $\mu$ can be chosen by the designer, and, in some embodiments, can be the "parameter" referred to in the term "parameter dependent Riccati equation," i.e., Equation 9.

In some embodiments, a condition that P>0 can be associated with the parameter dependent Riccati equation. This condition can impose a restriction on how the gains, $\Omega_1$ and $\kappa_2$, which can be employed in Equations 6a-6b and Equations 7a-7b, may be chosen. This is because, for example, for any positive value of $\mu$, the value of $K_1$ is bounded by $1/(1+\mu)$. Equation 8a, in turn, can limit how large the matrix $\Omega_1$ can be. Similarly, if $\nu = \kappa_2 + 1/\mu$, Equation 8a can impose an upper bound for $\nu$, which can be $\bar{\nu}$, such that P>0. Accordingly, Equation 9 can possess a positive definite solution for P for $0 < \nu < \bar{\nu}$. Thus, for any positive value of $\mu$, there can be an upper bound for $\kappa_2$ determined by $\bar{\nu}$.

Embodiments of the present invention can further comprise a method for adaptive control of an uncertain system. As shown in FIG. 1, the method can comprise providing a control command, u(t), to the uncertain system, causing the uncertain system to react. The control command can comprise a nominal control, $u_n(t)$, and an adaptive control, $u_{ad}(t)$. The method can further comprise the state observer receiving a sensed quantity, $y_s(t)$, from the uncertain system. The state observer can then output a state estimate, $\hat{x}(t)$. The controller can then employ the state estimate in a derivative-free adaptive control law to calculate a new adaptive control. The derivative-free adaptive control law can comprise a derivative-free weight update law. As discussed above, the derivative-free weight update law can comprise a time-varying ideal vector of weights, and does not assume constant ideal weights.

In some embodiments, the method can further comprise providing a new control command to the uncertain system. The new control command can comprise a new nominal control and a new adaptive control. The new adaptive control can be determined by the derivative-free adaptive control law, as discussed above.

In some embodiments, a special case can arise when, in Equation 2b, $y_s(t) = x(t)$ or $C_s = I$. These embodiments can correspond to cases of state feedback. In some embodiments, the state observer depicted in FIG. 1 may or may not be a part of the existing control system, depending, for example and not limitation, on the level of sensor noise that is present in the system. When the state observer is part of the existing control system, the controller and control system can function, for example, as described above. In some embodiments, where the state observer is not a part of the existing control system, however, the state observer depicted in FIG. 1 can be replaced, for example, with a reference model. The equation that defines the reference model can be the same as Equation 3, but, in some embodiments, L=0. In addition, in some embodiments, $A_e = A$ in Equation 8. The remainder of the controller and methods of control can function as described above.

Example

The derivative-free weight update law of Equations 7a-7b can be illustrated using a model of wing rock dynamics. Wing rock can be a nonlinear phenomenon in which an aircraft exhibits oscillations in roll at high angles of attack. A two-state model for wing rock dynamics can be written in the form given by Equations 10a-10b below, where w(t) represents sensor noise:

$$\begin{bmatrix} \dot{x}_1(t) \\ \dot{x}_2(t) \end{bmatrix} = \begin{bmatrix} 0 & 1 \\ 0 & 0 \end{bmatrix} \begin{bmatrix} x_1(t) \\ x_2(t) \end{bmatrix} + \begin{bmatrix} 0 \\ 1 \end{bmatrix} [u(t) + \Delta(t \cdot x(t))] \quad \text{Equation 10a}$$

$$y_s(t) = \begin{bmatrix} 1 & 0 \end{bmatrix} \begin{bmatrix} x_1(t) \\ x_2(t) \end{bmatrix} + w(t) \quad \text{Equation 10b}$$

Modeling uncertainty of the control system can be represented by Equation 11:

$$\Delta(t,x(t)) = [\alpha_1 + f_1(t)]x_1(t) + [\alpha_2 + f_2(t)]x_2(t) + \alpha_3|x_1(t)|x_2(t) + \alpha_4|x_2(t)|x_2(t) + \alpha_5 x_1^3(t) + d(t)$$

Equation 11:

Equation 11 can have constant coefficients $\alpha_1 = 0.23$, $\alpha_2 = 0.69$, $\alpha_3 = -0.62$, $\alpha_4 = 0.01$, and $\alpha_5 = 0.02$, time-varying coefficients $f_1(t)$, $f_2(t)$, and external disturbance $d(t)$. In Equation 10b, $x_1(t)$ can represent the roll angle, and $x_2(t)$ can represent the roll rate. The existing controller gains can be $K_1 = [2.56\ 2.56]$ and $K_2 = 2.56$. The existing state observer gain can be $L^T = [12.8\ 64.0]$. The adaptive control design can use sigmoidal basis functions of the form $\beta^T(x) = [0.5\ \beta_1(x_1)\ \beta_2(x_2)]$, where $$\beta_i = \frac{1 - e^{-x_i}}{a + e^{-x_i}},$$

$i = 1, 2$. Since $|\beta_i(x)| \leq 1$, it can follow that $\bar{\beta} = 1.5$. For $\mu = 0.05$ and $Q_o = 0.25 I_2$, it can be determined that $\bar{v} = 124.6$. This implies that, for this example, the adaptation gain in Equations 7a-7b must satisfy $\kappa_2 < 35.4$. Thus, in order to satisfy the conditions in Equations 8a-8b and 9, and therefore ensure a stable response, $\Omega_1 = 0.95 I_3$, $\kappa_2 = 35$, and $\tau = 0.01$ seconds can be chosen for the derivative-free weight update law in Equations 7a-7b.

Figure 2:
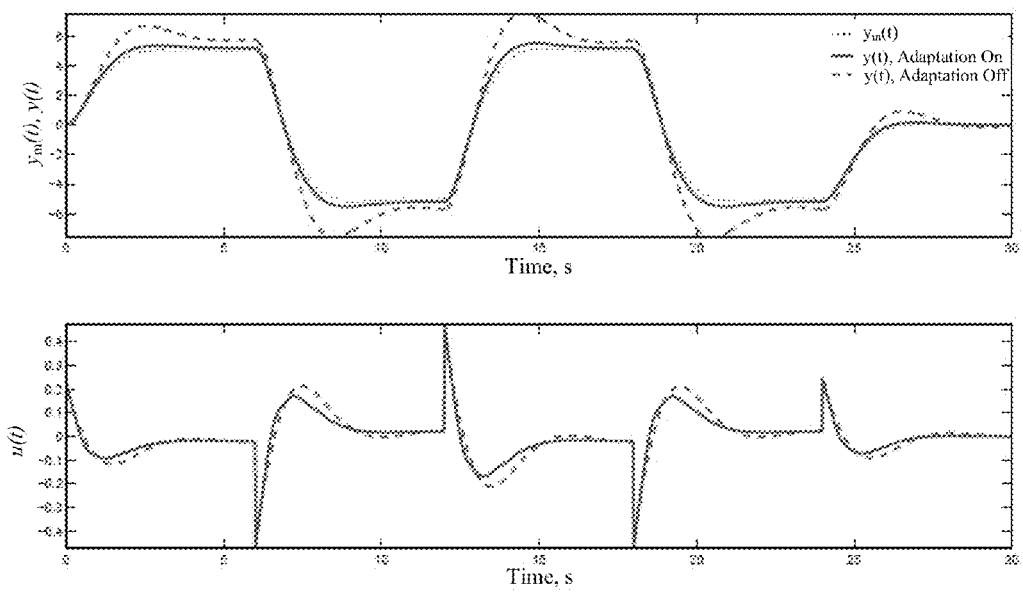
FIG. 2 depicts graphs showing nominal and adaptive control responses for an adaptive control design that assumes constant ideal weights, in accordance with some embodiments of the present invention.

In this example, a command tracking problem is considered. The initial conditions for the dynamics in Equations 10a-10b are set to zero. FIG. 2 compares the nominal (adaptation off) and the adaptive control (adaptation on) responses for the case when the ideal weights are constant ($f_1(t) = f_2(t) = 0$), and in the absence of disturbances and sensor noise ($d(t) = w(t) = 0$). As can be seen in FIG. 2, overall performance is significantly improved with adaptation on. This improvement is measured by comparing how well the responses follow a reference model response, $y_m(t)$, that corresponds to the situation in which the uncertainty, $\Delta(t,x(t))$, is zero.

Figure 3:
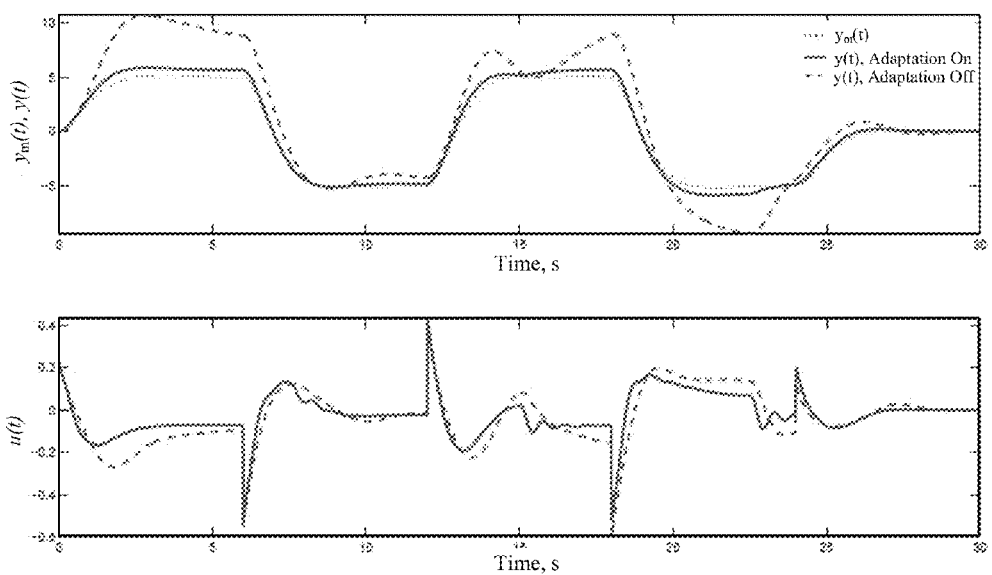
FIG. 3 depicts graphs showing nominal and adaptive control responses for an adaptive control design that assumes time-varying ideal weights, in accordance with some embodiments of the present invention.

FIG. 3 compares the responses for a case when the ideal weights are time-varying. $f_1(t)$ is a square wave having an amplitude of 0.5 and a period of 15 seconds and $f_2(t)$ is a sign wave defined by $f_2(t) = 0.5 \sin(1.5t)$. As can be seen by comparing FIGS. 2 and 3, the improvement with adaptation on is greater in FIG. 3 than it is in FIG. 2. This is because, in FIG. 3, the ideal weights are permitted to be time-varying. In addition, the effect of $f_1(t)$, which is discontinuous in time, is clearly evident in the nominal case because the response does not accurately track the model response.

Figure 4:
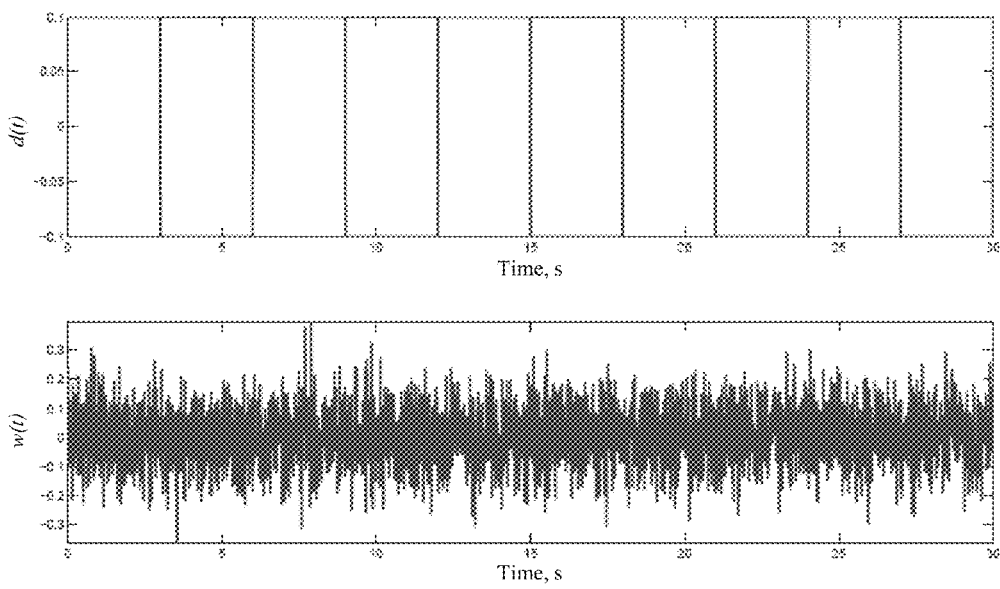
FIG. 4 depicts graphs showing disturbance and sensor noise, in accordance with some embodiments of the present invention.

FIG. 4 depicts the disturbance, $d(t)$, and measurement noise, $w(t)$. In this case, $d(t)$ is a square wave having an amplitude of 0.1 and a period of 6 seconds. To model sensor noise, $w(t)$ can be a band limited white noise process with a correlation time constant of 0.01 seconds, and a noise power level of 0.0001.

Figure 5:
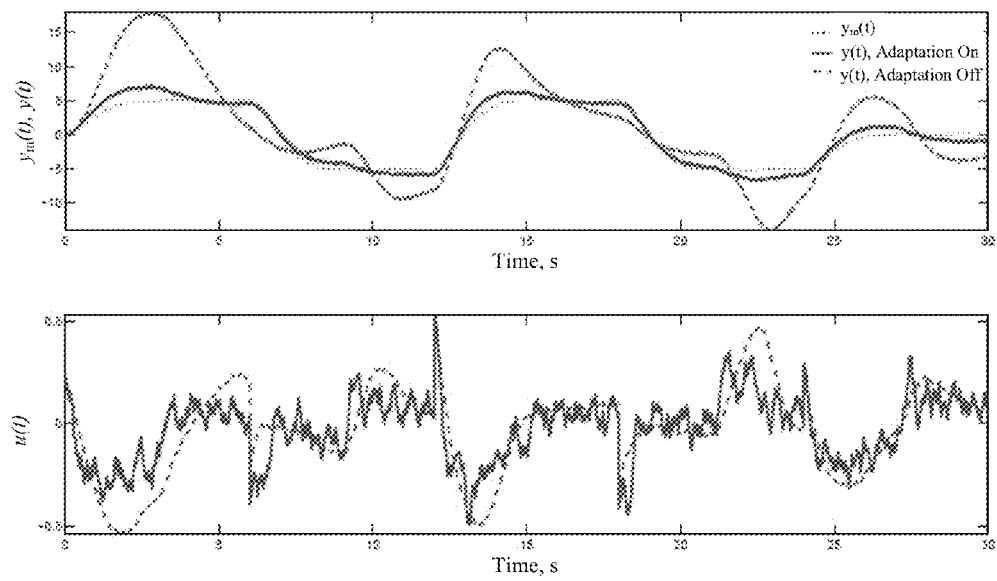
FIG. 5 depicts graphs showing nominal and adaptive control responses with disturbance and sensor noise for an adaptive control design that assumes time-varying ideal weights, in accordance with some embodiments of the present invention.

FIG. 5 shows that, even when disturbance and sensor noise is incorporated, tracking performance is significantly improved with adaptation on, and that the control time history is well behaved, i.e., sensor noise is not amplified. FIG. 5 includes a comparison between $\Delta(t,x(t))$ and $u_{ad}(t)$, which shows that $u_{ad}(t)$ nearly cancels $\Delta(t,x(t))$.

While several possible embodiments are disclosed above and throughout this specification, embodiments of the present invention are not so limited. For instance, while several possible control systems and derivative-free weight adaption laws have been provided, other suitable methods, configurations, or combinations could be selected without departing from the spirit of embodiments of the invention. In addition, the configuration used for various features of embodiments of the present invention can be varied according to the particular requirements of a plant or control system. Such changes are intended to be embraced within the scope of the invention.

The specific methods, method steps, systems, and other embodiments disclosed can be varied according to particular needs. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. An adaptive control system for controlling a vehicle, the adaptive control system comprising:
   a state observer configured to receive a sensed quantity from the vehicle, the state observer further configured to output a state estimate based at least in part on the sensed quantity; and
   a controller configured to receive the state estimate and to employ the state estimate in a derivative-free adaptive control law to calculate an adaptive control, the derivative-free adaptive control law based at least in part on a derivative-free weight update law, the controller further configured to output a control command that is an input to a control system of the vehicle for stabilizing or controlling the vehicle;
   wherein at least a component of the control command is the adaptive control; and
   wherein the derivative-free weight update law comprises the state estimate, a tracking error, a basis function, and a time-varying estimate of an ideal vector of weights.

2. The adaptive control system of claim 1, wherein the derivative-free weight update law further comprises a first gain, the first gain providing a parameter dependent Riccati equation with a positive definite solution.

3. The adaptive control system of claim 2, wherein a parameter other than the first gain of the parameter dependent Riccati equation restricts the values of the first gain for which the parameter dependent Riccati equation has a position definite solution.

4. The adaptive control system of claim 1,
   wherein the control command further comprises a nominal control from the control system of the vehicle, the nominal control comprising a first gain;
   wherein the adaptive control is added to the nominal control; and
   wherein the first gain of the nominal control is not modified by the adaptive control.

5. The adaptive control system of claim 4, wherein the nominal control comprises a first gain and a second gain, and either the first gain, the second gain, or both are employed by the state observer.

6. The adaptive control system of claim 1, wherein the adaptive control comprises a weight estimate and a basis function; and
   wherein the weight estimate is obtained from the derivative-free weight update law.

7. A method for adaptive control of an uncertain system associated with a vehicle, the method comprising:
   providing, by a controller associated with the uncertain system, a first control command as an input to the uncertain system, the first control command comprising a first adaptive control;
   receiving, by a state observer, at least one sensed quantity from the uncertain system;
   outputting, by the state observer and responsive to the at least one sensed quantity, a state estimate;

employing, by the controller, the state estimate in a derivative-free adaptive control law to calculate a second adaptive control, the derivative-free adaptive control law comprising a derivative-free weight update law; and outputting, by the controller, a second control command as an input to the uncertain system for stabilizing or controlling the uncertain system, the second control command comprising the second adaptive control;

wherein the derivative-free weight update law comprises the state estimate, a tracking error, a basis function, and a time-varying estimate of an ideal vector of weights.

8. The method for adaptive control of claim 7, wherein the derivative-free weight update law further comprises a first gain, the first gain selected to provide a parameter dependent Riccati equation with a positive definite solution.

9. The method for adaptive control of claim 8, wherein a parameter of the parameter dependent Riccati equation restricts the values of the first gain for which the parameter dependent Riccati equation has a positive definite solution.

10. The method for adaptive control of claim 7, wherein a weight estimate and a basis function are multiplied together to yield the second adaptive control, the weight estimate obtained from the derivative-free weight update law.

11. The method for adaptive control of claim 10, wherein the weight estimate is a function of continuous time.

12. The method for adaptive control of claim 10, wherein the weight estimate is a function of discrete time.

13. The method for adaptive control of claim 7, wherein the second control command comprises the second adaptive control added to a nominal control.

14. The method for adaptive control of claim 13, wherein the nominal control comprises a gain, and the gain is not modified by the adaptive control.

15. The method for adaptive control of claim 7, wherein the uncertain system is a non-minimum phase system.

16. An adaptive control system for controlling a vehicle, the adaptive control system comprising:

a reference model configured to output a state estimate; and a controller configured to receive the state estimate and employ the state estimate in a derivative-free adaptive control law to calculate an adaptive control, the derivative-free adaptive control law based at least in part on a derivative-free weight update law, the controller further configured to produce and output a control command that is an input to a control system of the vehicle for stabilizing or controlling the vehicle;

wherein at least a component of the control command is the adaptive control; and wherein the derivative-free weight update law comprises the state estimate, a tracking error, a basis function, and a time-varying estimate of an ideal vector of weights.

17. The adaptive control system of claim 16, wherein the derivative-free weight update law further comprises a first gain, the first gain providing a parameter dependent Riccati equation with a positive definite solution.

18. The adaptive control system of claim 17, wherein a parameter other than the first gain of the parameter dependent Riccati equation restricts the values of the first gain for which the parameter dependent Riccati equation has a position definite solution.

19. The adaptive control system of claim 16, wherein the control command further comprises a nominal control from the control system of the vehicle, the nominal control comprising a first gain;

wherein the adaptive control is added to the nominal control; and wherein the first gain of the nominal control is not modified by the adaptive control.

20. The adaptive control system of claim 16, wherein the adaptive control comprises a weight estimate and a basis function, the weight estimate obtained from the derivative-free weight update law.

* * * * *